(12) United States Patent
Ukigawa et al.

(10) Patent No.: US 7,742,983 B2
(45) Date of Patent: Jun. 22, 2010

(54) ACCOUNT SETTLEMENT METHOD IN ONLINE SHOPPING

(75) Inventors: Kazunori Ukigawa, Tokushima (JP); Hiroki Yamashita, Chiba (JP)

(73) Assignee: Justsystem Corporation, Tokushima (JP)

( * ) Notice: Subject to any disclaimer, the term of this patent is extended or adjusted under 35 U.S.C. 154(b) by 2982 days.

(21) Appl. No.: 09/775,591

(22) Filed: Feb. 5, 2001

(65) Prior Publication Data

US 2001/0021925 A1 Sep. 13, 2001

(30) Foreign Application Priority Data

Feb. 4, 2000 (JP) .............................. 2000-027814

(51) Int. Cl.
*G06Q 40/00* (2006.01)
(52) U.S. Cl. .......................................... 705/39; 705/40
(58) Field of Classification Search .............. 705/35–39
See application file for complete search history.

(56) References Cited

U.S. PATENT DOCUMENTS

| | | | |
|---|---|---|---|
| 5,890,137 A * | 3/1999 | Koreeda ....................... | 705/26 |
| 6,609,113 B1 * | 8/2003 | O'Leary et al. ................ | 705/39 |
| 2001/0034721 A1 | 10/2001 | Boudreau et al. | |

FOREIGN PATENT DOCUMENTS

| | | |
|---|---|---|
| JP | 08-147365 | 6/1996 |
| JP | 09/114891 | 5/1997 |
| JP | 10-214287 | 8/1998 |
| JP | 11-053441 | 2/1999 |
| JP | 11-088402 | 3/1999 |
| JP | 11-096363 | 4/1999 |
| JP | 11-143954 | 5/1999 |
| JP | 11-195063 | 7/1999 |
| JP | 11-212699 | 8/1999 |
| JP | 11-296583 | 10/1999 |
| JP | 11-296584 | 10/1999 |
| JP | 11-327717 | 11/1999 |

OTHER PUBLICATIONS

Lomax, Paul. Learning VBScript. O'Reilly & Associates, Inc. Sebastopol, California. 1997. pp. 457-459.*
Dogac, Asuman, Ozsu, M. Tamer & Ulusoy, Ozgur. Current Trends in Data Management Technology. Idea Group Publishing. Hershey, PA. 1999. pp. 41-42.*
Davis, Steven. Pragmatics: A Reader. Oxford University Press. New York, New York. 1991. pp. 217-219.*

* cited by examiner

*Primary Examiner*—Jason M Borlinghaus
(74) *Attorney, Agent, or Firm*—Sughrue Mion, PLLC

(57) ABSTRACT

An agent device is connected to a user device for browsing a merchant site, for selling products online and being served up on the Internet, the merchant site, and a server device of a credit-card company. In the case where an instruction of purchasing a product browsed by the user device is output, the instruction is sent to the agent device. The agent device extracts a credit card number of a credit card held by a user having purchased the product, and inquires of the server device of the credit card company whether the product is to be purchased with the credit card. As an inquiry result, in the case where the product can be purchased online with the credit card, the agent device sends an instruction that the user purchases the product online with the credit card.

15 Claims, 6 Drawing Sheets

| ID | PW | NAME | ----- | CREDIT CARD COMPANY | CREDIT CARD NUMBER |
|---|---|---|---|---|---|
| AB123 | **** | A.B.CUDDON | ----- | A | 9×××- ---- |
| AB124 | **** | C.D.MANSER | ----- | A | 9×××- ---- |
| AB124 | **** | C.D.MANSER | ----- | B | 4×××- ---- |
| AB125 | **** | G.H.HOWELL | ----- | B | 4×××- ---- |
| AB126 | **** | I.J.TURTON | ----- | C | 6×××- ---- |
| ⋮ | ⋮ | ⋮ | ⋮ | ⋮ | ⋮ |

ACCOUNT SETTLEMENT METHOD IN ONLINE SHOPPING

BACKGROUND OF THE INVENTION

1. Field of the Invention

The present invention relates to a technique for settling an account for a purchased product, using settlement means, such as a credit card, etc., in an online shopping system through the Internet.

2. Description of the Related Art

Along with the wide use of the Internet, merchant sites for selling products appear on the Internet, and various online shopping services are provided up to today. Conventionally, in the case where to purchase a product through any of the merchant site, an account for a purchased product is generally settled based on a credit card number which has been input by the user who ordered the product.

However, a technique for settling an account for a purchased product, in conventional online shopping systems, has the following problems.

Every time a user purchases a product, he/she needs to fill in a particular ordering form with required information such as his/her name, address, credit card number, etc. This is quite troublesome for any users. Even if the user has purchased a product from the same merchant site in the past, the user needs to input the required information. Since there are various types of ordering forms among merchant sites, the user has to fill in the ordering form in accordance with an operational rule of each merchant site.

Every time a product is purchased, it is necessary to send the user's credit card number, etc. to a merchant site through the Internet. Thus, there is a great possibility that personal information is leaked out on the Internet, and that damages to computer systems as caused by "cracking" are found.

Further, in the case where to purchase a product online, the credit card for use as settlement means for settling an account of the purchased product is limited only to a type of credit card specified in the merchant site. Those users who do not hold the type of credit card which is specified in the merchant site have to give up purchasing the product in the end, unless he/she desires to get a new credit card which is specified in the site. Such problems have prevented the popularization of the online shopping.

SUMMARY OF THE INVENTION

It is accordingly an object of the present invention to eliminate the need for performing inputting of data when a user purchases a product online.

Another object thereof is to prevent leakage of personal information online and to enhance the security, when a user purchases a product online.

Still another object thereof is to settle an account for a purchased product without the restriction of settlement means specified by the side of a distributor, and to facilitate the sales of products.

In order to achieve the above objects, according to the first aspect of the present invention, there is provided an online shopping system comprising:

at least one user device which is connected onto Internet and for reading a merchant site on the Internet;

an agent device which is connected to the at least one user device and the merchant site, relays and sends a purchase instruction from the at least one user device to the merchant site; and a settlement device which is connected to the agent device, and settles an account for a product purchased in accordance with the purchase instruction sent from the at least one user device, the at least one user device including purchase-instruction inputting means for inputting an instruction for purchasing a product on sale in the merchant site, and a first purchase-instruction sending means for sending ID (identification) information of a user, as a first purchase instruction, together with information regarding the product input by the purchase-instruction inputting means to the agent device, and the agent device including user-information storage means for storing the ID information, user information regarding the user, and information regarding settlement means held by the user, in association with each other, purchase-instruction receiving means for receiving the first purchase instruction sent from the first purchase instruction sending means, user-information extraction means for searching the user-information storage means for user information based on the ID information of the user which is included in the first purchase-instruction, and extracting corresponding information regarding the user and corresponding information regarding the settlement means, when the purchase-instruction receiving means receives the first purchase instruction, second purchase-instruction sending means for sending, as a second purchase instruction, information regarding the product and being included in the first purchase-instruction received by the purchase-instruction receiving means, and information regarding the user and being extracted by the user-information extraction means, to the merchant site, and settlement requesting means for requesting the settlement device for settling an account for the purchased product, based on the information regarding the product and being included in the first purchase instruction received by the purchase-instruction receiving means and the information regarding the settlement means of the user and being extracted by the user-information extraction means.

In the above-described online shopping system, the user of the user device can purchase the product on sale online in the merchant site, without the need for inputting the information regarding the settlement means (e.g., credit card, etc.) or his/her name every time the user purchases a product. The same user interface of the purchase-instruction inputting means can be employed for purchasing products in various merchant site. Hence, the user need to perform the same operation for purchasing products in the merchant sites. This eliminates the need for inputting the user information, and facilitates an easy operation for purchasing the product. The information regarding the settlement means of the user is not directly transmitted to the merchant site, thus preventing the leakage of the personal information of the user. This enables having the high security system.

In the above-described online shopping system, the agent device may further include inquiry means for inquiring whether the settlement means is valid, based on the information regarding the settlement means of the user which is extracted by the user-information extraction means. In this case, the second purchase-instruction sending means for inserting information representing that inquiring may be included in the second purchase instruction so as to be sent to the merchant site to the merchant site.

In the above-described online shopping system, the agent device may further include obtaining means for obtaining convenient-settlement means, for use only in settling the account for the product purchased in accordance with the first purchase instruction received by the purchase instruction receiving means, and which differs from the settlement means of the user. In this case, the second purchase-instruction sending means may insert information regarding the obtained convenient settlement means into the second purchase instruction, and send the second purchase instruction to the merchant site.

In this case, the information regarding the settlement means (e.g., the credit card number, etc.) held by the user is not to be leaked out. This enhances the security of the system. In this structure, the merchant site can sale products online in accordance with the conventional process.

The settlement device may include a plurality of settlement devices respectively corresponding to various types of settlement means. In this case, the obtaining means may obtain, as the convenient settlement means, settlement means corresponding to a type of settlement means which is specified in the merchant site, and the agent device may further include settlement storage means for storing information regarding the account for the purchased product between a settlement device corresponding to the obtained convenient settlement means and the merchant site, and information regarding settlement of the account for the purchased product between the settlement device which is requested to settle the account by the settlement requesting means and the user, in association with each other.

According to the above-described structure, the final settlement is achieved among a plurality of owners of the settlement devices, based on the recorded data of the settlement storage means. In this structure, even if the user does not hold the settlement means which is specified in the merchant site, he/she can still purchase a product from the site. Because the settlement means is not limited to the ones specified in the merchant site, the sale of the products online can be facilitated for wide use.

In the above-described online shopping system, it is preferred that the agent device and the settlement device are connected with each other through a private line.

In the above-described structure, the information regarding the settlement means held by the user is transmitted only through a private line, thus eliminating the possibility that such information is leaked out at a communications path. This enables to provide a high security online shopping system.

In order to achieve the above objects, according to the second aspect of the present invention, there is provided an online shopping method for a user of a user device to purchase a product on sale in a merchant site, in an online shopping system comprising:

the user device which is connected onto Internet and for reading a merchant site on the Internet;

an agent device which is connected to the user device and the merchant site, replays and sends a purchase instruction sent from the user device to the merchant site; and a settlement device which is connected to the agent device, and settles an account for a product purchased in accordance with the purchase instruction from the user device, and the method comprising:

a step of pre-registering ID information of the user, information regarding the user, and information regarding settlement means held by the user, in association with each other in a database of the agent device;

a step of inputting an instruction for purchasing a product on sale in the shopping site which is read by the user device;

a step of sending, as a first purchase instruction, the ID information of the user together with information regarding the input product from the user device to the agent device;

a step of searching the database for user information based on the ID information of the user which is included in the first purchase instruction, and extracting corresponding information regarding the user and corresponding information regarding the settlement means, as performed by the agent device which has received the first purchase instruction;

a step of sending, as a second purchase instruction, information regarding the user and being extracted from the database from the agent device to the merchant site, together with information regarding the input product; and a step of requesting, from the agent device, the settlement device for settling the account for the input product, based on information regarding the settlement means of the user and being extracted from the database.

In order to achieve the above objects, according to the third aspect of the present invention, there is provided a user device which is connected to Internet, browses a merchant site on the Internet, and sends an instruction for purchasing a product on sale in the merchant site, the user device comprising:

purchase-instruction inputting means for inputting a purchase instruction of a product on sale in the browsed merchant site;

product-information extraction means for extracting information regarding a product to be purchased from contents of the browsed merchant site and information regarding specified settlement means; and purchase-instruction sending means for sending, as a purchase instruction, the information regarding the product and being extracted by the product-information extraction means and the information regarding the settlement means, together with ID information of a user, to an agent device which is prepared separately from the merchant site and intermediates in a purchase process between the merchant site and the user device.

In the above-described user device may further comprise:

merchant-site determination means for determining whether the merchant site is browsed; and instruction-input permission means for permitting, when the merchant-site determination means determines that the merchant site is browsed, an input of an instruction from the purchase-instruction inputting means.

In the above-described user device, the purchase-instruction inputting means may be prepared separately from instruction means included in the contents of the browsed merchant site.

In order to achieve the above objects, according to the fourth aspect of the present invention, there is provided a user device including a memory for storing a program, a processor for executing the program, an input device for inputting an instruction of a user, a display device for displaying information, and a communications device for transmitting/receiving information with a merchant site served up on Internet, wherein the processor executes the program stored in the memory, thereby:

accessing the merchant site from the communications device, and controlling the communications device to receive contents of the merchant site;

displaying the contents of the merchant site which are received by the communications device on the display device;

permitting the user to input an instruction for purchasing a product on sale in the contents of the merchant site which are displayed on the display device;

extracting information regarding the product to be purchased from the contents of the merchant site displayed on the display device and information regarding specified settlement means; and controlling the communications device to send, as a purchase instruction, the extracted information regarding the product and the information regarding the settlement means, together with ID information of the user to an agent device, which is prepared separately from the merchant site and intermediates in a product purchase process between the user device and the merchant site.

In order to achieve the above objects, according to the fifth aspect of the present invention, there is provided a method for browsing a merchant site served up on Internet using a computer device, and for sending an instruction for purchasing a product on sale in the browsed merchant site, the method comprising:

a step of inputting an instruction for purchasing the product on sale in the browsed merchant site;

a step of extracting information regarding the product to be purchased in the browsed merchant site and information regarding specified settlement means, when the instruction is input; and a step of sending, as a purchase instruction, the extracted information regarding the product and the information regarding the settlement means, together with ID information of a user, to an agent device which is prepared separately from the merchant site and intermediates in a purchase process between the computer device and the merchant site.

In order to achieve the above objects, according to the sixth aspect of the present invention, there is provided an agent device which is connected to a user device for browsing a merchant site served up on Internet, the merchant site, and a settlement device for settling an account for a product purchased in accordance with a purchase instruction from the user device, the agent device comprising:

user-information storage means for storing ID information of a user using the user device, information regarding the user, and information regarding settlement means held by the user, in association with each other;

purchase-instruction receiving means for receiving, as a first purchase instruction, from the user device, information regarding the product to be purchased by the user on sale in the merchant site and the ID information of the user;

user-information extraction means for searching the user-information storage means for use information based on the ID information included in the first purchase instruction, and extracting corresponding information regarding the user and corresponding information regarding settlement means;

inquiry means for inquiring of the settlement device whether the settlement means is valid, based on the information regarding the settlement means and being extracted by the user-information extraction means;

purchase-instruction sending means for sending, as a second purchase instruction, to the merchant site, the information regarding the user and being extracted by the user-information extraction means and information representing that inquiring is performed by the inquiry means, together with the information regarding the product and being included in the first purchase instruction received by the purchase instruction receiving means; and settlement requesting means for requesting the settlement device for setting a bill for a purchased product, based on the information regarding a product and being included in the second purchase instruction received by the purchase-instruction receiving means and the information regarding the settlement means and being extracted by the user-information extraction means.

In order to achieve the above objects, according to the seventh aspect of the present invention, there is provided an agent device comprising: a memory for storing a program; a processor for executing the program; a communications device for transmitting/receiving information with a merchant site served up on Internet, a user device used by a user purchasing a product on sale online in the merchant site, and a settlement device for settling an account for a product purchased in accordance with a purchase instruction from the user device; and a database for registering ID information of the user using the user device, information regarding the user, and information regarding settlement means held by the user, and wherein the processor executes the program stored in the memory, thereby:

controlling the communications device to receive, as a first purchase instruction from the user device, the ID information of the user together with information regarding a product to be purchased by the user on sale in the merchant site;

searching the database for user information based on the ID information included in the first purchase instruction received by the communications device, and extracting corresponding information regarding the user and corresponding information regarding settlement means;

controlling the communications device to inquire of the settlement device whether the settlement means is valid, based on the information regarding the settlement means and being extracted from the database;

controlling the communications device to send, as a second purchase instruction, the information regarding the user and being extracted from the database and information representing that the settlement means is inquired, together with the information regarding the product and being included in the first purchase instruction received by the communications device to the merchant site; and controlling the communications device to request the settlement device for settling an account for a purchased product included in the first purchase instruction received by the communications device, based on the information regarding the settlement means of the user and being extracted from the database.

In order to achieve the above objects, according to the eighth aspect of the present invention, there is provided an agent device which is connected to a user device for browsing a merchant site served up on Internet, the merchant site, and a settlement device for settling an account for a product purchased in accordance with a purchase instruction from the user device, the agent device comprising:

user-information storage means for storing ID information of a user using the user device, information regarding the user and information regarding settlement means held by the user, in association with each other;

purchase-instruction receiving means for receiving, as a first purchase instruction from the user device, the ID information of the user together with information regarding a product to be purchased by the user, of a plurality of products on sale online in the merchant site;

user-information extraction means for searching the user-information storage means for user information based on the ID information included in the first purchase instruction, and extracting corresponding information regarding the user and the corresponding information regarding the settlement means;

obtaining means for obtaining convenient settlement means, for use only in settlement of the account for the product purchased in accordance with the first purchase instruction received by the purchase instruction receiving means, and which differs from the settlement means of the user which is extracted by the user-information extraction means;

purchase-instruction sending means for sending, as a second purchase instruction, the information regarding the user and being extracted by the user-information extraction means, together with the information regarding the product and being included in the first purchase instruction received by the purchase instruction receiving means, to the merchant site; and settlement requesting means for requesting the settlement device for settlement of an account for the product purchased by the user, based on the information regarding the product and being included in the first purchase instruction received by the purchase-instruction receiving means, and the information regarding the settlement means of the user and being extracted by the user-information extraction means. In order to achieve the above objects, according to the ninth aspect of the present invention, there is provided an agent device comprising: a memory for storing a program; a processor for executing the program; a communications device for transmitting/receiving information with a merchant site served up on Internet, a user device used by a user purchasing a product on sale online in the merchant site, and a settlement device for settling an account for a product purchased in accordance with a purchase instruction sent from the user; and a database for registering ID information of the user using the user device, information regarding the user, and information regarding settlement means held by the user, and wherein the processor executes the program stored in the memory, thereby:

controlling the communications device to receive, as a first purchase instruction, the ID information of the user, together with information regarding the product to be purchased by the user on sale in the merchant site, from the user device;

searching the database for user information based on the ID information included in the first purchase instruction received by the communications device, and extracting corresponding information regarding the user and corresponding information regarding settlement means;

obtaining convenient settlement means, for use only in settlement of the account for the product purchased by the user in accordance with the first purchase instruction received by the communications device, and which differs from the settlement means of the user which is extracted by the user-information extraction means;

controlling the communications device to send, as a second purchase instruction to the merchant site, the user information extracted from the database and information regarding the convenient settlement means as settlement means for the account, together with the information regarding the product and being included in the first purchase instruction received by the communications device; and controlling the communications device to request the settlement device for settling the account for the purchased product included in the first purchase instruction received by the communications device, based on the information regarding the settlement means of the user and being extracted from the database.

In order to achieve the above objects, according to the tenth aspect of the present invention, there is provided a method executed in a computer device, which is connected to a user device for reading a merchant site served up on Internet, the merchant site, and a settlement device for settling an account for a product purchased in accordance with a purchase instruction from the user device, the method comprising:

a step of pre-registering ID information of a user using the user device, user information regarding the user, and information regarding settlement means held by the user;

a step of receiving, as a first purchase instruction, ID information of the user together with information regarding a product to be purchased by the user on sale in the merchant site, from the user device;

a step of searching the database based on the ID information included in the received first purchase instruction, and extracting corresponding information regarding the user and corresponding information regarding the settlement means;

a step of inquiring of the settlement device whether the settlement means is valid, based on the information regarding the settlement means of the user and being extracted from the database;

a step of sending, as a second purchase instruction, the information regarding the user and being extracted from the database and information representing that the settlement means is inquired, together with the information regarding the product and being included in the received first purchase instruction, to the merchant site; and a step of requesting the settlement device for settling an account for the purchased product included in the received purchase instruction, based on the information regarding the settlement means of the user and being extracted from the database.

In order to achieve the above objects, according to the eleventh aspect of the present invention, there is provided a method executed in a computer device, which is connected to a user device for reading a merchant site served up on Internet, the merchant site, and a settlement device for settling an account for a product purchased in accordance with a purchase instruction from the user device, the method comprising:

a step of pre-registering, in a database, ID information of a user using the user device, user information regarding the user, and information regarding settlement means held by the user, in association with each other;

a step of receiving, as a first purchase instruction, the ID information of the user from the user device, together with information regarding a product to be purchased by the user on sale in the merchant site;

a step of searching the database for the user information based on the ID information included in the received first purchase instruction, and extracting corresponding information regarding the user and corresponding information regarding the settlement means;

a step of obtaining convenient settlement means, for use in settlement of the account for the product purchased in accordance with the received first purchase instruction, and which differs from the settlement means of the user and being extracted from the user-information extraction means;

a step of sending, as a second purchase instruction, information regarding the user and being extracted from the database and information regarding the convenient settlement means as settlement means for settling the account for the product, together with the information regarding the product and being included in the received first purchase instruction; and a step of requesting the settlement device for settling the account for the product included in the received first purchase instruction, based on the information regarding the settlement means of the user and being extracted from the database.

In order to achieve the above objects, according to the twelfth aspect of the present invention, there is provided a computer readable recording medium recording a program making a computer device, which is connected onto Internet and capable of browsing a merchant site served up the Internet, function as:

purchase-instruction inputting means for inputting an instruction for purchasing a product on sale in the browsed merchant site;

product-information extraction means for extracting information regarding a product to be purchased and information regarding specified settlement means from contents of the browsed merchant site, when the instruction is input from the purchase-instruction inputting means; and purchase-instruction sending means for sending, as a purchase instruction, the information regarding the product and being extracted by the product-information extraction means and the information regarding the settlement means, together with ID information of a user, to an agent device, which is prepared separately from the merchant site and intermediates in a purchase process between the user and the merchant site.

In the computer readable recording medium, the program may make the computer device further function as:

merchant-site determination means for determining whether a merchant site is being browsed; and instruction-input permission means for permitting an input of an instruction from the purchase-instruction inputting means, when the merchant-site determination means determined that the merchant site is being browsed.

In order to achieve the above objects, according to the thirteenth aspect of the present invention, there is provided a computer readable recording medium recording a program making a computer device, connected to a user device for browsing a merchant site served up on Internet, the merchant site, and a settlement device for settling an account for a product purchased in accordance with a purchase instruction from the user device, function as:

user-information storage means for storing ID information of a user using the user device, user information of the user, and information regarding settlement means held by the user, in association with each other;

purchase-instruction receiving means for receiving, as a first purchase instruction from the user device, the ID information of the user, together with information regarding a product to be purchased by the user on sale in the merchant site;

user-information extraction means for searching the user-information storage means for the user information based on the ID information included in the first purchase instruction, and extracting corresponding information regarding the user and corresponding information regarding settlement means, when the purchase-instruction receiving means receives a first purchase instruction;

inquiry means for inquiring of the settlement device whether the settlement means is valid, based on the information regarding the settlement means of the user and being extracted by the user-information extraction means;

purchase-instruction sending means for sending, as a second purchase instruction, the information regarding the user and being extracted by the user-information extraction means and information representing that inquiring is performed by the inquiry means, together with the information regarding the product included in the first purchase instruction received by the purchase-instruction receiving means, to the merchant site; and settlement requesting means for requesting the settlement device for settling an account for a product, based on the information regarding the product and being included in the second purchase instruction received by the purchase-instruction receiving means, and the information regarding the settlement means of the user and being extracted by the user-information extraction means.

In order to achieve the above objects, according to the fourteenth aspect of the present invention, there is provided a computer readable recording medium recording a program which makes a computer device, which is connected to a user device for browsing a merchant site served up on Internet, the merchant site, and a settlement device for settling an account for a product purchased in accordance with a purchase instruction from the user device, function as:

user-information storage means for storing ID information of a user using the user device, user information of the user, and information regarding settlement means held by the user, in association with each other;

purchase-instruction receiving means for receiving, as a first purchase instruction, the ID information of the user, together with information regarding a product to be purchased by a user on sale in the merchant site, from the user device;

user-information extraction means for searching the user-information storage means for user information based on the ID information of the user and being included in the first purchase instruction, and extracting corresponding information regarding the user and information regarding the settlement means, when the purchase-instruction receiving means receives the first purchase instruction;

obtaining means for obtaining convenient settlement means, for use only in settlement of an account for a product purchased in accordance with the first purchase instruction received by the purchase-instruction receiving means, and which differs from the settlement means of the user extracted by the user-information extraction means;

purchase-instruction sending means for sending, as a second purchase instruction, the information regarding the user extracted by the user-information extraction means, and information regarding the convenient settlement means as settlement means for settling an account for a product, together with the information regarding the product included in the first purchase instruction received by the purchase instruction receiving means; and settlement requesting means for requesting the settlement device for settling an account for a purchased product, based on the information regarding the product and being included in the first purchase instruction received by the purchase instruction receiving means, and the information regarding the settlement means of the user and being extracted by the user-information extraction means.

In order to achieve the above objects, according to the fifteenth aspect of the present invention, there is provided a program data signal embodied in a carrier wave and transmitted through a communications path, the signal making a computer device, which is connected to Internet and can browse a merchant site served up on Internet, function as:

purchase-instruction inputting means for inputting an instruction for purchasing a product on sale in the browsed merchant site;

product-information extraction means for extracting information regarding a product to be purchased and information regarding specified settlement means from contents of the browsed merchant site; and purchase-instruction sending means for sending, as a purchase instruction, the information regarding the product and being extracted by the product information extraction means and the information regarding the settlement means, together with ID information of a corresponding user to an agent device which is prepared separately from the merchant site and intermediates in a purchase process between the user and the merchant site.

In order to achieve the above objects, according to the sixteenth aspect of the present invention, there is provided a program data signal embodied in a carrier wave and transmitted through a communication path, the signal making a computer device, which is connected to a user device for browsing a merchant site served up on Internet, the merchant site, and a settlement device for settling an account for a product purchased in accordance with a purchase instruction from the user device, function as:

user-information storage means for storing ID information of a user using the user device, user information of the user, and information regarding settlement means held by the user, in association with each other;

purchase-instruction receiving means for receiving, as a first purchase instruction, the ID information of the user together with information regarding a product to be purchased by a user on sale in the merchant site, from the user device;

user-information extraction means for searching the user-information storage means for user information based on the ID information included in the first purchase instruction, and extracting corresponding information regarding the user and information regarding the settlement means, when the purchase-instruction receiving means receives the first purchase instruction;

inquiry means for inquiring of the settlement device whether the settlement means is valid, based on information regarding settlement means of the user extracted by the user-information extraction means;

purchase-instruction sending means for sending, as a second purchase instruction, the information regarding the user and being extracted by the user-information extraction means and information representing that inquiring is performed by the inquiry means, to the merchant site; and settlement requesting means for requesting the settlement device for settling an account for a purchased product, based on the information regarding the product and being included in the second purchase instruction received by the purchase-instruction receiving means and the information regarding settlement means of the user extracted by the user-information extraction means.

In order to achieve the above objects, according to the seventeenth aspect of the present invention, there is provided a program data signal embodied in a carrier wave and transmitted through a communications path, the signal making a computer device, which is connected to a user device for browsing a merchant site served up on Internet, the merchant site, and a settlement device for settling an account for a product purchased in accordance with a purchase instruction from the user device, function as:

user-information storage means for storing ID information of a user using the user device, user information of the user, and information regarding settlement means held by the user, in association with each other;

purchase-instruction receiving means for receiving, as a first purchase instruction, the ID information of the user together with information regarding a product to be purchased by the user on sale in the merchant site, from the user device;

user-information extraction means for searching the user-information storage means for the user information based on the ID information of the user included in the first purchase instruction, and extracting corresponding information regarding the user and corresponding information regarding the settlement means, when the purchase instruction receiving means receives the first purchase instruction;

obtaining means for obtaining convenient settlement means, for use only in settling an account of a product purchased in accordance with the first purchase instruction received by the purchase instruction receiving means, and which differs from the settlement means of the user extracted by the user-information extraction means;

purchase-instruction sending means for sending, as a second purchase instruction, the information regarding the user extracted by the user-information extraction means and the information regarding the convenient settlement means as settlement means for settling the account for the purchased product, together with the information regarding the product included in the first purchase instruction received by the purchase-instruction receiving means, to the merchant site; and settlement requesting means for requesting the settlement device for settling the account for the purchased product, based on the information regarding the product included in the first purchase instruction received by the purchase-instruction receiving means and the information regarding the settlement means of the user extracted by the user information extraction means.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will now be explained with reference to the accompanying drawings. In this specification, the term "product" includes not only tangible goods, but also intangible goods, for example, services, intellectual property, information, etc. Additionally, the term "online shopping" indicates a merchant style, wherein users order online any products to be delivered online or offline.

First Embodiment

Figure 1A:
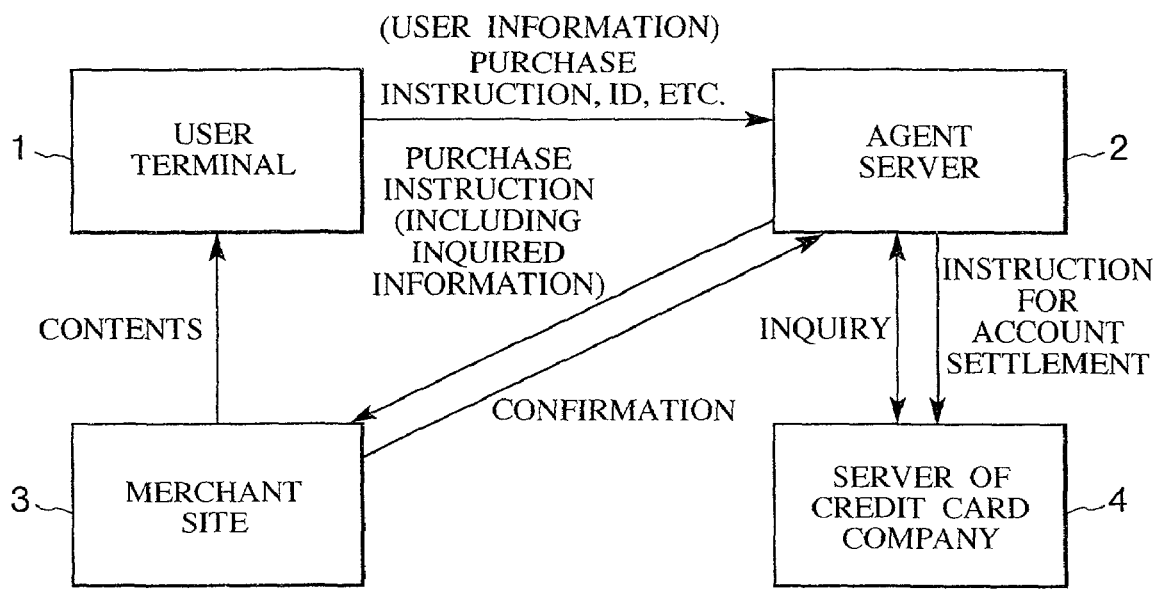
FIG. 1A is a diagram showing a flow of information to be transmitted online in an online shopping system according to the first embodiment of the present invention.
Figure 1B:
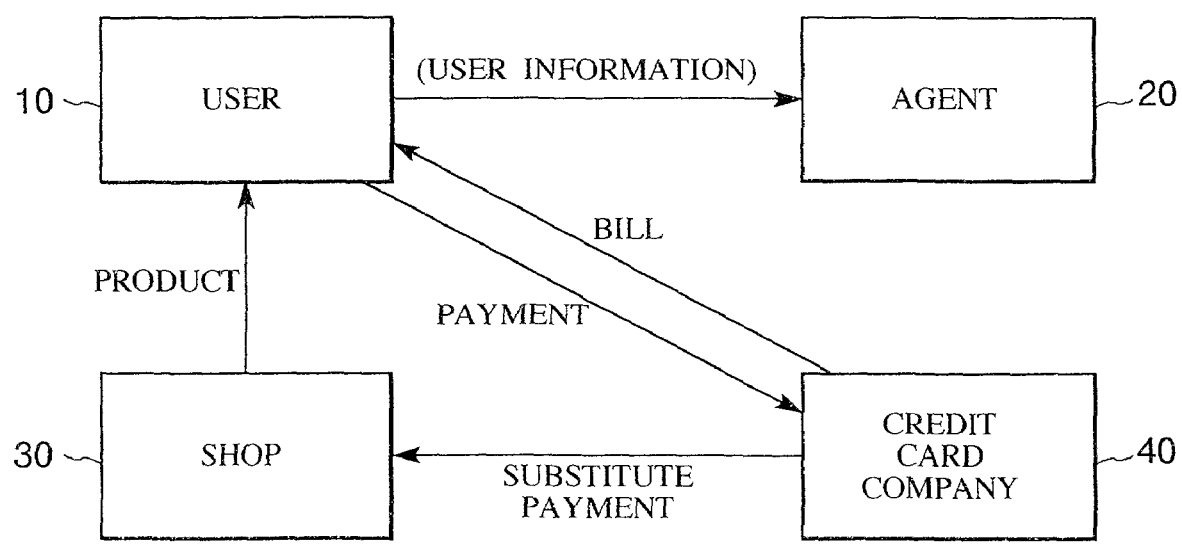
FIG. 1B is a diagram showing the flow of information, products, money, etc. to be dealt mainly off-line in the online shopping system according to the first embodiment.

FIG. 1A shows the flow of information to be transmitted online in the online shopping system according to the first embodiment of the present invention. FIG. 1B shows the flow of information, products, money, etc. to be dealt mainly offline in the online shopping system.

This online shopping system comprises, as shown in FIG. 1A, a user terminal 1, an agent server 2, a merchant site 3, and a server 4 of a credit-card company. The user terminal 1, the agent server 2, the merchant site 3, and the server 4 of a credit-card company are owned by a user 10, an agent 20, a shop 30, and a credit-card company 40, respectively. Note that the user 10 is not necessarily owned by the user 10, as long as the user 10 operates the user terminal 1. The user terminal 1, the agent server 2 and the merchant site 3 are connected with each other through the Internet. The agent server 2 and the server 4 are connected with each other through a private line.

The user terminal 1 includes a personal computer connectable to the Internet, PDA (Portable Digital Assistant), cellular phone, etc. The user terminal 1 displays contents provided by the merchant site 3 to the user 10 who can then browse the contents, and sends an instruction necessary for the user 10 to purchase a particular product (hereinafter, referred to as a purchase instruction) to the agent server 2. The user terminal 1 is prepared also for inputting user information including the name, address, credit-card number of the user 10, etc., and sending the input user information to the agent server 2. The user terminal 1 will specifically be described later.

The agent server 2 is a computer prepared for the agent 20 to intermediate between the user 10 and the shop 30 to help their transaction. The agent server 2 forwards the purchase instruction to the merchant site 3, and sends an instruction (hereinafter, referred to as a settlement instruction) for settling a bill for the product purchased by the user on-line to the server 4. The agent server 2 will specifically be described later. The merchant site 3 is one of Web sites served on the Internet, and provides the contents for the user 10 to purchase a product on-line. The server 4 of the credit-card company is cooperative with the agent server 2, and is a computer for processing any process for the credit-card company 40 to settle an account for the products purchased by holders of a credit card.

In the case where the user 10 purchases a product using the online shopping system, the product for which the user 10 has sent the purchase instruction is delivered to the user 10 from the shop 30 offline. The credit-card company 40 issues a bill for the product to the user 10. The user 10 pays for the product to the credit-card company 40. The payment for the product to the shop 30 is done by the credit-card company 40 instead of the user 10.

Figure 2:
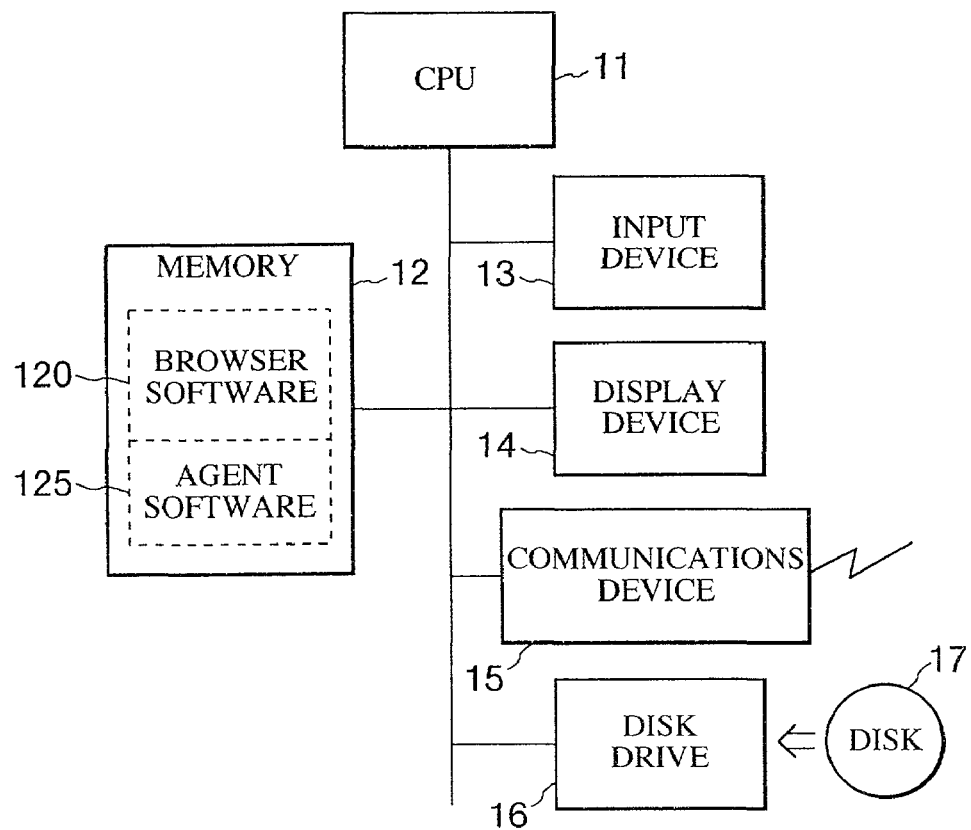
FIG. 2 is a block diagram showing the structure of a user terminal shown in FIG. 1A.

FIG. 2 is a block diagram showing the structure of the user terminal 1 shown in FIG. 1A. As shown in FIG. 2, the user terminal comprises a CPU (Central Processing Unit) 11, a memory 12, an input device 13, a display device 14, a communications device 15, and a disk drive 16. The memory 12 includes a storage area for browser software 120 and a storage area for agent software 125.

The CPU 11 executes the programs stored in the memory 12. The CPU 11 controls inputs, outputs, data communications, etc., so as to execute the process necessary for the user 10 to perform the online shopping operation. The memory 12 stores programs including the browser software 120 and agent software 125, and is used as a work area while the CPU 11 executes any program.

The browser software 120 is a program generally for use in displaying the contents served up on the Internet. The agent software 125 is activated as a background process along with the activation of the browser software 120. The agent software 125 monitors the contents to be displayed under the control of the browser software 120. In the case where the display contents are those for the merchant site 3, the agent software 125 controls to display an agent window, as will be explained later, on the display device 14. The browser software 120 and the agent software 125 will further be explained later.

The input device 13 includes a keyboard and a pointing device, such as a mouse, and inputs an instruction from the user 10. The input device 13 may have a microphone, and may be one for inputting an instruction upon a predetermined voice produced by the user. The display device 14 includes a CRT (Cathode Ray Tube) or an LCD (Liquid Crystal Display), and displays the contents retrieved from the merchant site 3 through the browser software 120. The communications device 14 includes a modem or the like, and performs data communications with the agent server 2 and the merchant site 3.

The disk drive 16 reads out data recorded on a disk 17 as a computer readable recording medium including a CD-ROM, DVD, etc., under the control of the CPU 11, and forwards the read data to the memory 12. The browser software 120 and/or the agent software 125 may be stored on the disk 17, and read out by the disk drive 16 from the disk 17 so as to be stored in the memory 12. The browser software 120 and/or the agent software 125 may be embedded in a carrier wave from a Web site served up on the Internet, transmitted through the Internet so as to be received by the communications device 15, and stored in the memory 12.

Figure 3:
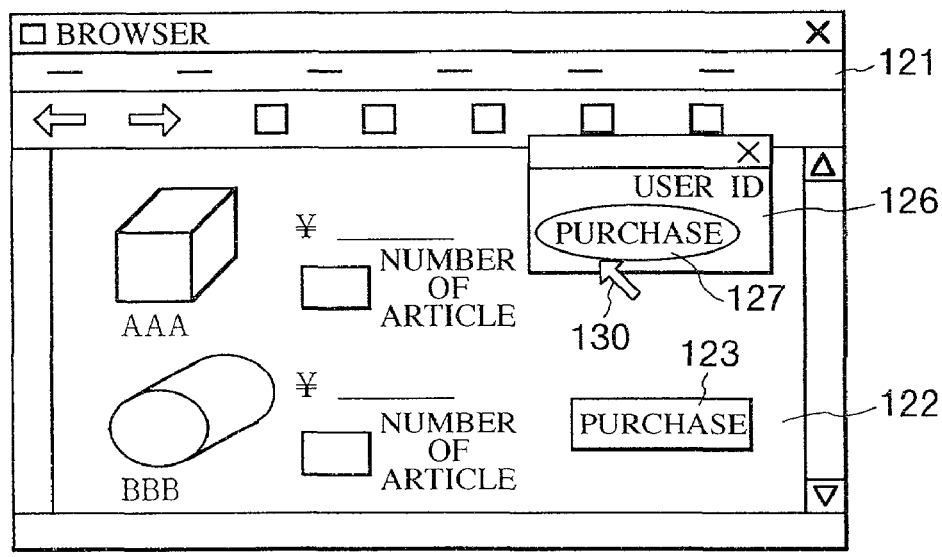
FIG. 3 is a diagram showing a browser window and an agent window which are displayed on a display device of the user terminal shown in FIG. 1A.

The browser software 120 and the agent software 125 will now be described in accordance with the display screen on the display device 14. As shown in FIG. 3, when the user terminal 1 accesses the merchant site 3, a browser window 121 for displaying contents 122 of the merchant site 3 and an agent window 126 for the user 10 inputting a purchase instruction are displayed on the display device 14.

The contents 122 in the browser window 121 include a "Purchase" button 123. This "Purchase" button 123 is one for sending a purchase instruction, as selected by the user 10, to the merchant site 3. This "Purchase" button 123 is the same as one conventionally employed in the online shopping.

The agent window 126, as well, includes a "Purchase" button 127. This "Purchase" button 127 is one for sending a purchase instruction to the merchant site 3 through the agent server 2, but not for directly sending the instruction to the merchant site 3. When the user clicks the mouse in the state where a mouse cursor 130 is placed on the "Purchase" button 127, the agent software 125 obtains information (including a name of a product to be purchased, its product code, the number of the product to the purchased, a receiver of the purchase instruction, etc.) regarding the contents 122 in the browser window 126. Then, the agent software 125 sends the obtained information to the agent server 2.

Figures 4, 5:
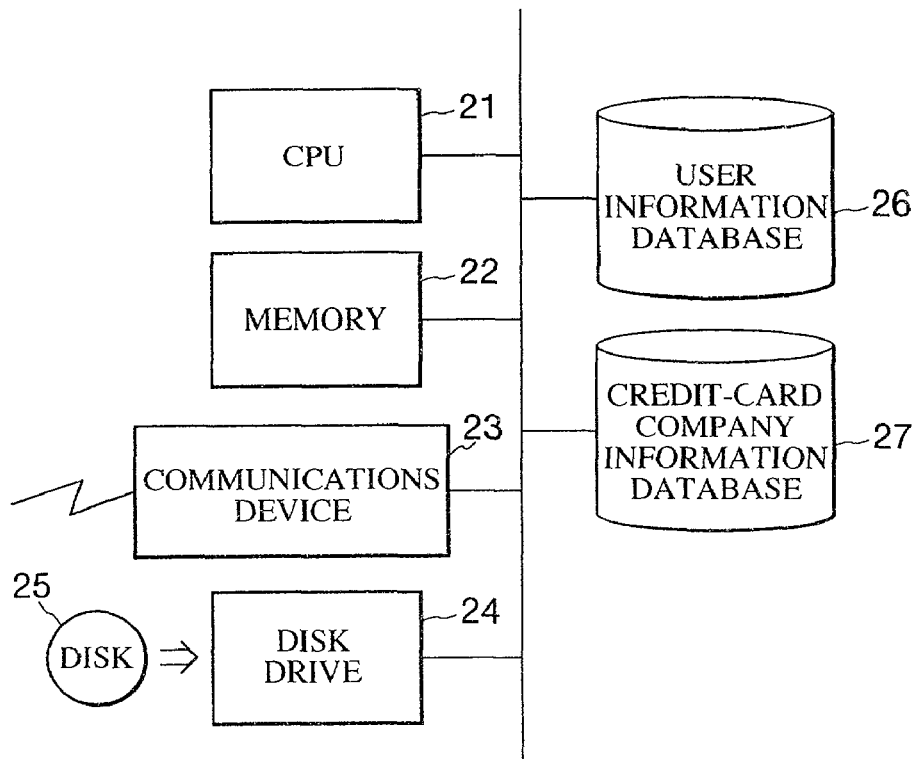
FIG. 4 is a block diagram showing the structure of an agent server shown in FIG. 1A.
FIG. 5 is a diagram showing the structure of a user information database shown in FIG. 4.

FIG. 4 is a block diagram showing the structure of the agent server 2 of FIG. 1A. As illustrated in FIG. 4, the agent server 2 comprises a CPU 21, a memory 22, a communications device 23, a disk drive 24, a user information database 26, and a credit-card company information database 27.

The CPU 21 executes the program stored in the memory 22, and, upon reception of the purchase instruction for a particular product from the user terminal 1, carries out the process necessary for the user 10 to purchase the product. The memory 22 stores the program executed by the CPU 21, and serves as a work area while the CPU 21 executes the program. The communications device 23 performs data communications with the user terminal 1 and the merchant site 3 through the Internet and with the server 4 through a private line.

The disk drive 24 reads out the data stored on the disk 25, and forwards the read data into the memory 22, under the control of the CPU 21. The program stored in the memory 22 may be one which has been stored on the disk 25 and distributed therefrom, or one which has been embedded in a carrier wave from a Web site on the Internet so as to be transmitted through the Internet.

The user information database 26 is a database which records information regarding the user 10 using a technique for settling an account for purchased product(s) provided by the agent server 2 (the agent 20). The user information database 26 will specifically be described later. The credit-card company information database 27 is a database which stores information regarding the server 4 or the credit card company 40.

Figure 6:
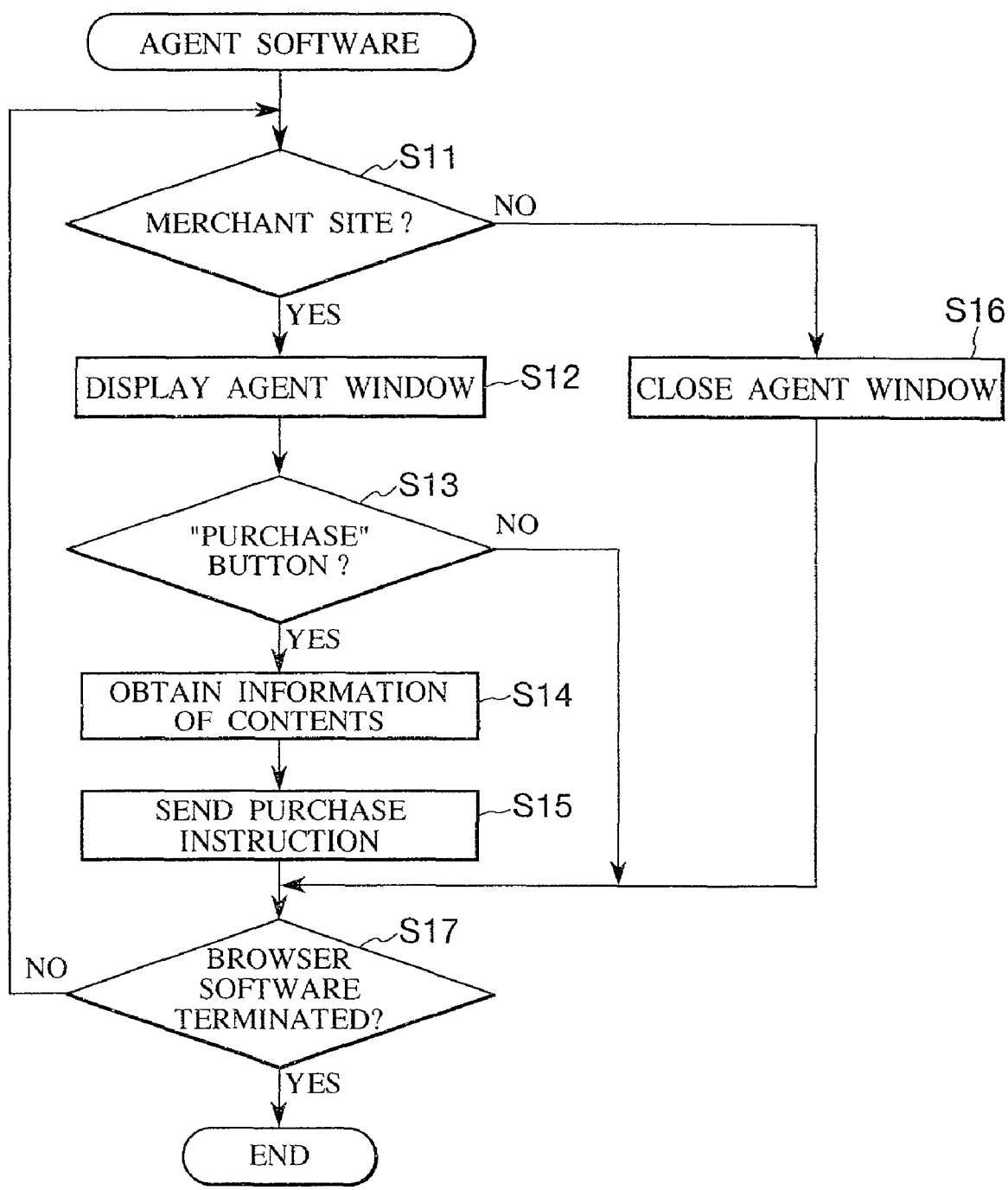
FIG. 6 is a flowchart showing a process to be carried out by agent software installed in the user terminal shown in FIGS. 1A and 2.

FIG. 5 is a diagram showing the structure of the user information database 26. As shown in FIG. 6, the user information database 26 registers data in the form of a table. In the database 26, each record (a row in the table) includes fields of "User ID", "Password (PW)", "User Name", "Any other User Attribute" (denoted by " . . . " in the illustration), "Credit Card Company", and "Credit Card Number".

A user ID is used for identifying the user 10. When the information (the information shown on the right-hand side with respect to the field of "Name of User 10" in the table of FIG. 5) regarding the user 10 is registered in the user information database 26, the user ID is issued by the CPU 21 in accordance with a predetermined rule, and registered in association with the information regarding the user 10. A password is used for verifying whether the user 10 having sent the purchase instruction from the user terminal 1 is a proper user.

The data registered in the field of "User Name" represents the name of the user 10. In the field of "User Attribute", data including the address, age, telephone number, birthday of the user is registered. In the field of "Credit Card Company", the credit card company which has issued the credit card held by the user is registered. In the field of "Credit Card Number", the number of the credit card held by the user 10 is registered. In the case where a single user 10 holds a plurality of credit cards, data regarding each credit card is registered in the database 26 in the unit of one record in association with the user 10.

Processes to be carried out in the online shopping system according to this embodiment will now be described. To settle the bill for any product purchased by a user 10 using the online shopping system of this embodiment with a credit card, the user information regarding the user 10 is necessarily registered in advance in the user information database 26. The registration of the user information into the user information database 26 can be achieved in accordance with any one of the following examples.

In the first example, prior to the registration of the user information, the user 10 sends a request for a predetermined registration form to the agent 20 so as to acquire the registration form therefrom. The user 10 fills in the registration form with user information regarding him/herself, and sends back the registration form to the agent 20. Upon reception of this registration from, an operator of the agent 20 inputs the user information written in the registration form through an input device (not illustrated), so as to register the user information in the user information database 26. During this registration, the user ID and a initial password are issued. The issued user ID and the initial password are registered in the user information database 26 in association with each other, and delivered to the user 10 from the agent 20. The user 10 operates the input device 13, so as to set the delivered user ID in the agent software 125, thereby enabling to purchase products online.

In the second example, a predetermined page for registration is acquired by accessing the agent server 2 through the Internet from the user terminal 1. The user 10 operates the input device 13 to fill in the page with user information, and sends back the page from the user terminal 1. Upon reception of the filled page, the agent server 2 extracts the user information filled by the user in the page, and registers the extracted user information in the user information database 26. During this registration, a user ID and an initial password are issued. The issued user ID and the initial password are registered in the user information database in association with each other, and sent to the user terminal 1 through the Internet. After this, the user 10 performs a process for setting the received user ID in the agent software 125, thereby enabling to purchase products online.

In the third example, when the user 10 purchases a package program including the agent software 125, user registration is processed in the customer-support of the company selling the package program. Those items for the user registration includes the credit-card number of the user 10. In this case, when registering the package program online or offline, the agent server 2 can simultaneous register the user information into the user information database 26. In the case where the user 10 purchases a package program including the agent software 125 from the agent server 2 online, the agent server 2 requests the user 10 to input his/her name and address so as to perform the above registration, because the user 10 might have already input the credit card number used for purchasing the package program.

In the fourth example, if the agent 20 having a function as the agent server 2 is an Internet service provide, the agent server 2 may register necessary information, included in the user information provided by the user when signing a contract, in the user information database 26, as user information for the online shopping.

In the online shopping system according to this embodiment, explanations will now be made to processes for purchasing a product on sale in the merchant site 3 online. Those processes includes: 1) a process carried out in the user terminal 1; and 2) a process carried out in the agent server 2.

1) Process Carried Out in User Terminal 1

The user 10 operates the input device 13 to input an instruction for activating the browser software 120. In response to this instruction, the browser software 120 is activated, and the agent software 125 is activated as well. The browser software 120 and the agent software 125 are parallelly operated in the user terminal 1. The browser software 120 is for use in accessing a merchant site, etc., by inputting its corresponding URL, and the same as the browser software which is generally used. In this specification, operations of the agent software 125 will be described, and operations of the browser software 120 will not particularly be described.

FIG. 6 is a flowchart showing a process to be carried out by the agent software 125 in the user terminal 1. The CPU 11 executes the agent software 125, thereby to determine whether the contents 122 displayed in the browser window 121 are to somehow represent the merchant site 3 (Step S11). This determination can be achieved by, for example, searching a predetermined keyword, and performing predetermined natural language processing into sentences of the contents 122.

In the case where the contents 122 are to represent the merchant site 3, the CPU 11 displays the agent window 126 on the display device 14 (Step S12). Note that if the agent window 126 has already been displayed, it simply continues to be displayed thereon. After this, the CPU 11 determines whether the user 10 has clicked on the "Purchase" button 127 in the agent window 126 (Step S13).

In the case where the "Purchase" button 127 has been clicked, the CPU 11 extracts information (including type of product to be purchased, the number of products, price, specified credit card company, etc) which is necessary for specifying to purchase a particular product (Step S14). The CPU 11 processes the user ID set into the agent software 125, the password input by the user 10 through the input device 13, and the information extracted in the step S14, into a predetermined data format. Then, the CPU 11 controls the communications device 15 to send the processed data as a purchase instruction to the agent server 2 through the Internet (Step S15), and the flow advances to the procedure of Step S17. In the case where the "Purchase" button has not been clicked in the step S13, the flow advances to the procedure of Step S17.

When determined that the contents 122 are not to represent the merchant site 3 in Step S11, the CPU 11 closes the agent window 126 displayed on the display device 14 (Step S16). If the agent window 126 had not been displayed before that, it is continuously not to be displayed, and the flow advance to Step S17.

In the step S17, the CPU 11 determines whether the browser software 120 has been terminated. In the case where the browser software 120 has not been terminated, and it is still in an activation state, the flow returns to the procedure of Step S11, wherein the determination of whether the contents 122 are to represent the merchant site 3. On the contrary, if the browser software 120 has been terminated, the CPU 11 also terminates the agent software 125.

During the above-described procedures, when the contents 122 displayed in the browser window 121 are switched to represent the merchant site 3, the agent window 126 is displayed on the display device 14, whereby the user can input a purchase instruction for a particular product. On the other hand, when the contents 122 are switched to represent some kind of a site other than the merchant site 3, the agent window 126 is not displayed on the display device 14.

2) Process Carried Out by Agent Server 2

Figure 7:
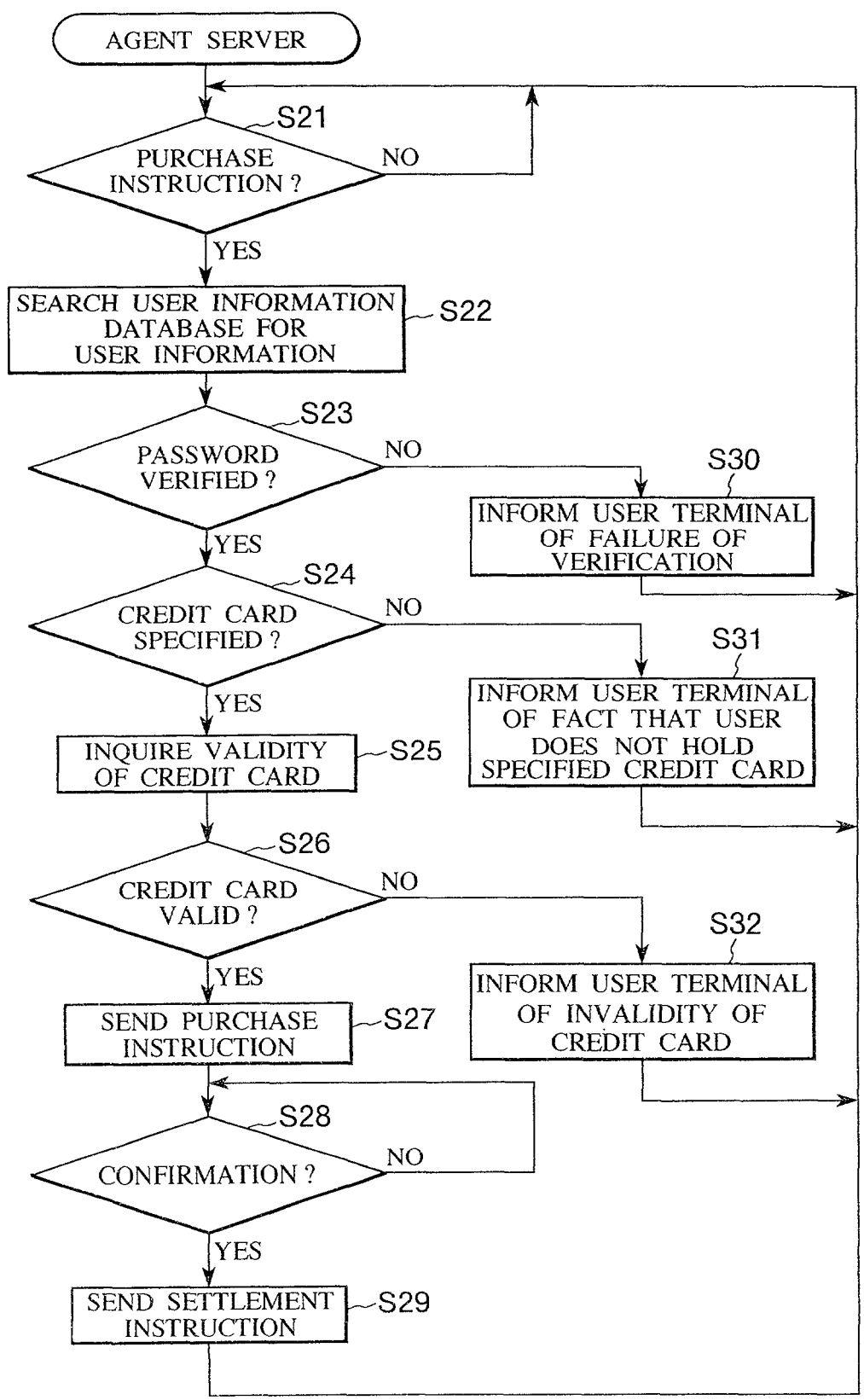
FIG. 7 is a flowchart showing a process to be carried out by an agent server shown in FIGS. 1A and 4.

In the agent server 2, the program shown in the flowchart of FIG. 7 is always executed, for receiving a purchase instruction from the user terminal 1, forwarding the received purchase instruction to the merchant site 3, and sending a settlement instruction to the server 4.

The CPU 21 determines whether the purchase instruction (refer to the step S15) sent from the user terminal 1 through the Internet has been received by the agent server 2 (Step S21). In the case where it is determined that the purchase instruction is not received, the CPU 21 repeats the procedure of the step S21, and waits for the purchase instruction to be received. In the case where it is determined that the purchase instruction is received, the CPU 21 searches the user information database 26 for corresponding user information based on a user ID included in the received purchase instruction, and retrieves all records which correspond to the user ID (Step S22).

The CPU 21 compares the password in the retrieved records with a password included in the purchase instruction, and determines whether the user 10 has been verified based on the password (Step S23). When it is determined that the user 10 has been verified, the CPU 21 compares the credit card company in each of the retrieved records with the credit card company included in the purchase instruction. Then, the CPU 21 determines whether there is a correspondence between the two, i.e. whether the user 10 having sent the purchase instruction holds the credit card of a company specified in the merchant site 3 (Step S24).

In the case where a corresponding credit card company is detected, i.e. where the user 10 holds the specified credit card, the CPU 21 controls the communications device 23 to send the credit card number to the server 4 through a private line. The CPU 21 inquires the validity of the credit card number (Step S25). Then, the CPU 21 determines whether the credit card number is valid, based on the inquired result sent from the server 4 (Step S26).

When determined that the credit card is valid, the CPU 21 processes information (including the name, address, telephone number, credit card number of the user 10, information representing that his/her credit card number has already been inquired, type of product to be purchased, number of the products to be purchased, and its price) which is necessary for purchasing any product, into a predetermined data format. Then, the CPU 21 controls the communications device 23 to send the processed data as a purchase instruction to the merchant site 3 through the Internet (Step S27). After this, the CPU 21 waits for confirmation to be sent from the merchant site 3 in response to the sent purchase instruction (Step S28).

Upon reception of the confirmation from the merchant site 3, the CPU 21 processes information (including the credit card number, the name of the user 10, the total price, the name of the merchant site 3 (the shop 30) providing the purchased product, etc.) which is necessary for settling the bill, into a predetermined data format. In addition, the CPU 21 controls the communications device 23 to send the processed data as a settlement instruction to the server 4 through the private line (Step S29). The flow returns to the procedure of the step S21, wherein the CPU 21 waits for another purchase instruction as sent from the user terminal 10.

When determined that the user 10 has not been verified n the step S23, the CPU 21 controls the communications device 23 to send a message for informing the user terminal 1 of the failure of verification of authenticity through the Internet (Step S30). After this, the flow returns to the procedure of the step S21, wherein the CPU 21 waits for another purchase information, as will be sent from the user terminal 1.

When determined, in the step S24, that the user does not hold a credit card specified in the merchant site 3, the CPU 21 controls the communications device 23 to send a message for informing the user terminal 1 of the fact that the user does not hold the specified credit card (Step S31). Then, the flow returns to the procedure of the step S21, wherein the CPU 21 waits for another purchase instruction as will be sent from the user terminal 10.

When it is determined that the credit card of the user 10 is not valid, based on the inquired result in the server in the step S26, the CPU 21 controls the communications device 23 to send a message for informing the user terminal 1 of the invalidity of the credit card from the communications device 23 through the Internet (Step S32). Then, the flow returns to the procedure of the step S21, wherein the CPU 21 waits for another purchase instruction, as will be sent from the user terminal 10.

Explanations will now specifically be made to information, products, money, etc. to be dealt in the online shopping system of this embodiment with reference to FIGS. 1A and 1B. The explanations will be made into the case where the user 10 purchases a product on sale in the merchant site 3, and the user 10 settles the bill with a credit card.

In the case where the user 10 uses the online shopping system, the user registers in advance his/her own user information into the user information database 26, in accordance with any one of the above-described examples.

When purchasing a product, the user 10 accesses the merchant site 3 from the user terminal 1 through the Internet, acquires the contents provided by the merchant site 3, and displays the acquired contents on the display device 14 (particularly, in the browser window 121) of the user terminal 1. At this time, the agent window 126 is also displayed on the display device 14.

After this, the user 10 inputs the number of product(s) to be purchased through the input device 13, in accordance with information of the contents 122. At the same time, the user clicks on the "Purchase" button 127 in the agent window 126. Having performed this, the purchase instruction including the user ID sent in the user terminal 10 is sent to the agent server 2 from the user terminal 1 through the Internet.

In the agent server 2, user information is searched within the user information database 26 in accordance with the received user ID. If the user 10 holds a credit card which is specified in the merchant site 3, a request for inquiring the credit card is sent to the server 4 through the private line. As a result of the inquiry, in the case where the credit card can validly be used, a purchase instruction is sent to the merchant site 3 from the agent server 2. Upon reception of confirmation of the purchase instruction from the merchant site 3, the agent server 2 sends a settlement instruction to the server 4.

Thereafter, the purchased product is delivered to the user 10 from the shop 30. The payment for the product to the shop 30 is performed by the credit card company 40. The credit card company 40 issues a bill for the purchased product with the credit card to the user 10, whereby the user 10 is to pay for the purchased product.

As explained above, in the online shopping system according to this embodiment, if the user 10 once registers the user information including the credit card number, etc. before purchasing any product, there is not need for the user 10 to input the user information again. When purchasing a product, the user 10 simply clicks on the "Purchase" button 127 included in the agent window 126, regardless of the type of the merchant site 3. Hence, the trouble process of inputting the user information is reduced, thus realizing an easy operation of the online shopping system.

Once the information regarding the credit card of the user 10 is registered into the user information database 26, such information is transmitted only between the agent server 2 and the server 4 through the private line. This prevents the leakage of such information onto the Internet, thus enhancing the security in the online shopping system. Furthermore, the information regarding the credit card of the user 10 is not given to the shop 30 as an establisher of the merchant site 3. In this structure, the personal information of the user 10 can be prevented from being leaked out to a third party.

Second Embodiment

Figure 8A:
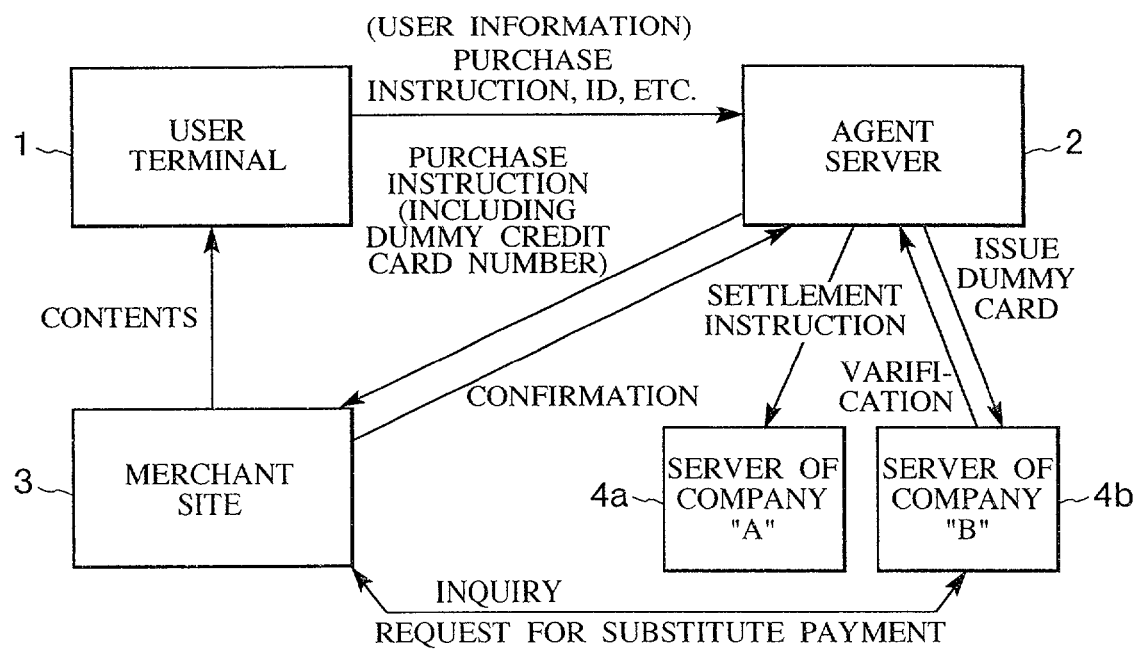
FIG. 8A is a diagram showing a flow of information to be dealt online in an online shopping system according to the second embodiment of the present invention.
Figure 8B:
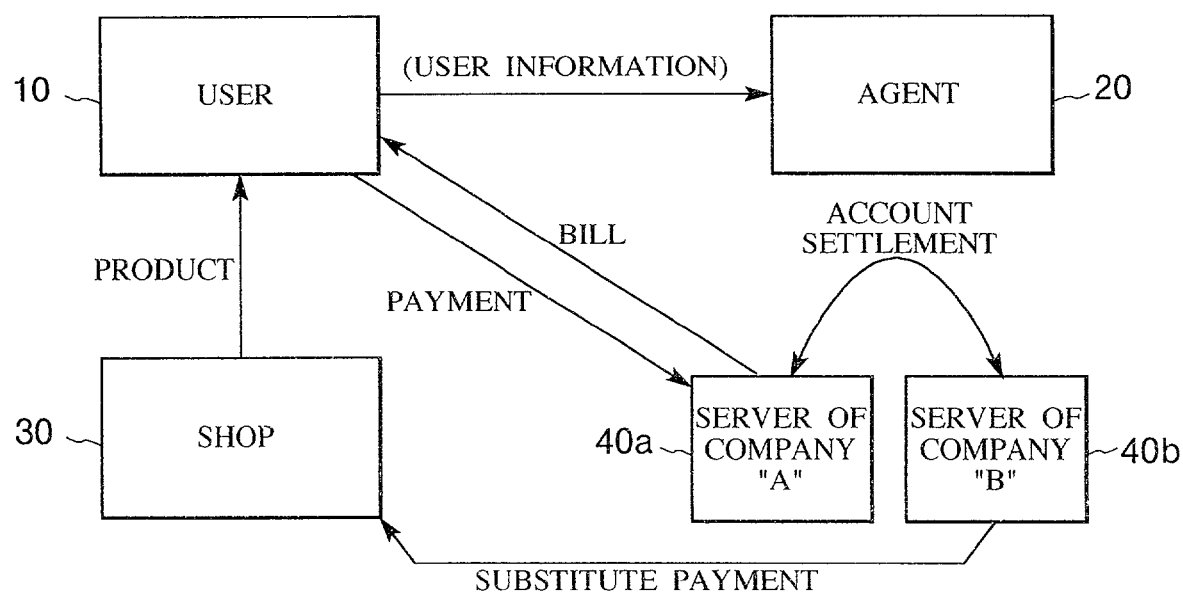
FIG. 8B is a diagram showing a flow of information and products, money, etc. to be dealt mainly off-line in the online shopping system according to the second embodiment.

FIG. 8A shows the flow information to be dealt in an online shopping system of this embodiment, and FIG. 8B shows the flow of information, products, money, etc. to be dealt mainly offline.

The online shopping system of this embodiment differs from that of the first embodiment, from one aspect that the agent server 2 is connected to a plurality of servers 4a and 4b of credit card company through private lines, respectively. The merchant site 3 inquires of the servers 4a and 4b based on a credit card number (a dummy credit card number, as will be explained later) sent from the agent server 2. The payment for the purchased product to the shop 30 is done by credit card companies ("A" 40a, and "B" 40b).

When a purchase instruction is sent from the user terminal 1, the agent server 2 issues a dummy credit card number corresponding to the credit card companies 40a and 40b specified in the merchant site 3 for convenience' sake, instead of sending information representing that the credit card of the user 10 is validly inquired. The agent server 2 sends the issued dummy credit card number as a credit card number of the user 10 to the merchant site 3 together with information including the name, address, and such of the user 10 corresponding to the user ID.

The servers 4a and 4b verify the dummy credit card number issued by the agent server 2. The servers 4a and 4b sends a response representing that the dummy credit card number is valid, with reference to the inquiry done by the merchant site 3. The servers 4a and 4b carries out a process necessary for settling an account for the purchased product, based on the proper credit card number of the user sent from the agent server 2.

The agent server 2 can send confirmation of the verification of the dummy credit card number and an instruction for settling the account to the servers 4a and 4b of the separate credit card companies. The agent server 2 stores information regarding the issued dummy credit card number and information (each of which includes the price of product(s) purchased by the user) necessary for settling the account for the purchased product(s), in the credit-card company information database 27. The agent 20 as the owner of the agent server 2 makes the credit card companies 40a and 40b settle the balance of the accounts stored in the credit-card company information database 27, at a predetermined interval. In order to achieve this process, the agent 20 makes a particular contract with the credit card companies 40a and 40b as the owners of the servers 4a and 4b.

The user terminal 1 has the same structure as that of the first embodiment, and the agent software 125 in the user terminal 1 performs the same operations as those of the first embodiment. The user information database 26 inside the agent server 2 has the same structure as that explained in the first embodiment. The operations in the merchant site 3 are exactly the same as the operations for conventionally performing the online shopping.

Explanations will now specifically be made to the flow of information, products, money, etc. to be dealt in the online shopping system according to the second embodiment, with reference to FIGS. 8A and 8B. The explanations will be made to the case where the user 10 purchases a product on sale in the merchant site 3 and settles the bill for the purchased product with a credit card. Let it be assumed that the merchant site 3 specifies credit cards of only the credit card company "B" 40b, and the user 10 holds only a credit card of the credit card company "A" 40a.

Likewise in the first embodiment, the user 10 registers in advance his/her own user information in the user information database 26. Likewise in the first embodiment, when to purchase a product, the user 10 accesses the merchant site 3, input the quantity of the product to be purchased in accordance with information of the contents 122 of the site, and clicks on the "Purchase" button 127. Having performed this, a purchase instruction including the user ID set in the user terminal 10 is sent to the agent server 2 from the user terminal 1 through the Internet.

The agent server 2 issues, as a dummy credit card number, a credit card number representing the credit card company "B" 40b specified in the merchant site 3, so as to acquire verification of the dummy credit card number from the server 4b. The agent server 2 searches the user information database 26 for user information of the user 10, in accordance with the user ID included in the purchase instruction. Further, the agent server 2 creates a purchase instruction collectively including information regarding the issued dummy credit card number, the name and address of the user, and the product to the purchased. Then, the agent server 2 sends the created purchase instruction to the merchant site 3 through the Internet.

The merchant site 3 inquires of the server 4b, based on the dummy credit card number included in the received purchase instruction, and sends a bill for the purchased product to the credit card company "B" 40b. The merchant site 3 sends information for confirming that the purchase instruction has been received to the agent server 2. Upon reception of the confirmation information, the agent server 2 sends an instruction for settling the account for the purchased product to the server 4a corresponding to the credit card held by the user 10. At the same time, the agent server 2 stores information regarding the purchase of the product in the credit-card company information database 27.

After this, the purchase product is delivered to the user 10 from the shop 30. The payment for the purchased product to the shop 30 is done by the credit card company "B" 40b. The credit card company "A" 40a issues a bill for the product purchased with the credit card to the user 10, whereby the user 10 pays for the product to the credit card company "A" 40a. The account for the purchased product(s) is settled between the credit companies "A" and "B" in the end, based on the stored information of the credit-card company information database 27.

As explained above, in the online shopping system according to the second embodiment, a dummy credit card number is issued in the agent server 2 so as to be sent to the merchant site 3. Hence, even if the merchant site 3 corresponds only to the conventional system, and if a credit card number is necessary for sending a purchase instruction, the user 10 can still purchase a product on sale in the merchant site 3. The credit card information originally kept by the user 10 does not leak out onto the Internet, hence preventing the leakage of the personal information of the users 10.

Even if the merchant site 3 does not specify a type of credit card held by the user 10, as long as the merchant site 3 specifies any type of the credit cards of the credit card companies 4a and 4b which make a contract with the agent 2, the user 10 can still purchase the product with a dummy credit card number. Having employed the online shopping system according to the second embodiment, the user can purchase a product regardless of the type of credit card which is specified by the merchant site 3. This should cause the online shopping system to be widely accepted and used.

In addition, likewise in the first embodiment, in the online shopping system according to the second embodiment, the user 10 needs to register his/her personal information including the credit card number, etc. only once. The same operation for purchasing the product, as performed by the user 10, is required for any type of the merchant site 3. Hence, the trouble process of inputting the user information is reduced, thus realizing an easy operation of the online shopping system.

Modification

In the above-described first embodiment, every time the purchase instruction is sent from the user terminal 1, the agent server 2 inquires of the credit card corresponding to the user ID included in the received purchase instruction to the server 4. However, the agent server 2 may acquire information (including credit information) regarding each credit card of the user 10, which is registered in the user information database 26, periodically from the server 4, and store the acquired information in the user information database 26 or the credit-card company information database 27, thereby to easily inquire the credit card.

In the above-described second embodiment, the agent server 2 issues a dummy credit card number, and requests the servers 4a and 4b for verification of the issued credit card number. The agent server 2 may request the servers 4a and 4b for issuing of a dummy credit card number. In response to this request, the servers 4a and 4b may issue a dummy credit card number, and give this dummy credit card number to the agent server 2.

In the above-described first and second embodiments, the agent software 125 is activated, upon the activation of the browser software 120. When the merchant site is identified, the agent software 125 displays the agent window 126 on the display device 14. However, the agent window 126 may always be displayed on the display device 14 during the activation of the browser software 120, without the identifying of the merchant site. Instead of separately preparing the browser software 120 and the agent software 125, browser software having a function of the agent software 125 may be adapted. The agent software 125 may be activated, upon activation of integrated software having a function for reading the contents on the Internet or any other application software. The function of the agent software 125 may be included in the integrated software.

In the above-described first and second embodiments, when the user 10 clicks on the "Purchase" button 127 in the agent window 126, the purchase instruction is to be sent to the agent server 2. However, a function for sending the purchase instruction to the agent server 2 may be assigned to a predetermined function key on the keyboard. The agent software 125 monitors whether the "Purchase" button 123 in the contents 122 has been clicked. When the "Purchase" button 123 has been clicked, the agent software 125 may send the purchase instruction to the agent server 2 instead of the merchant site 3.

In the above-described first and second embodiments, the agent server 2 and the server 4 (4a and 4b) are connected with each other through the private line. However, the agent server 2 and the server 4 may be connected with each other through the Internet. Since the agent 20 and the credit card company 40 make a contract with each other, a complicated encryption technique may be applied to the data transmitted onto the Internet. In this structure, the personal information can highly be prevented from being leaked out, as compared with the conventional online shopping system.

The function of the agent server 2 which has been described in the first and second embodiments may be provided by an Internet Service Provider. The user terminal 1 and the agent server 2 may be connected with each other through a public telephone line in the use of dial-up access, for example. The user terminal 1 and the merchant site 3 may be connected with each other through the agent server 2.

In the first and second embodiments, the explanations have been made to the case where the product on sale in the merchant site 3 is purchased with a credit card as settlement means. However, the present invention can be adapted to the case where the account is settled using a bank card (debit card), as settlement means, from the savings.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-27814 filed on Feb. 4, 2000, and including specification, claims, drawings and summary. The disclosure of the above Japanese Patent Application is incorporated herein by reference in its entirety.

What is claimed is:

1. An online shopping system comprising:
    at least one user device which is connected onto Internet and for reading a merchant site on the Internet;
    an agent device which is connected to said at least one user device and the merchant site, relays and sends a purchase instruction from said at least one user device to the merchant site; and
    a settlement device which is connected to said agent device, and settles an account for a product purchased in accordance with the purchase instruction sent from said at least one user device,
    said at least one user device including
    purchase-instruction inputting means for inputting an instruction for purchasing a product on sale in the merchant site, and
    a first purchase-instruction sending means for sending ID (identification) information of a user, as a first purchase instruction, together with information regarding the product input by said purchase-instruction inputting means to said agent device, and said agent device including
    user-information storage means for storing the ID information, user information regarding the user, and information regarding settlement means held by the user, in association with each other,
    purchase-instruction receiving means for receiving the first purchase instruction sent from said first purchase instruction sending means,
    user-information extraction means for searching said user-information storage means for user information based on the ID information of the user which is included in the first purchase-instruction, and extracting corresponding information regarding the user and corresponding information regarding the settlement means, when said purchase instruction receiving means receives the first purchase instruction,
    second purchase-instruction sending means for sending, as a second purchase instruction, information regarding the product and being included in the first purchase instruction received by said purchase-instruction receiving means, and information regarding the user and being extracted by said user-information extraction means, to the merchant site, and
    settlement requesting means for requesting said settlement device for settling an account for the purchased product, based on the information regarding the product and being included in the first purchase instruction received by said purchase-instruction receiving means and the information regarding the settlement means of the user and being extracted by said user-information extraction means.

2. The online shopping system according to claim 1, wherein:
    said agent device further includes inquiry means for inquiring whether the settlement means is valid, based on the information regarding the settlement means of the user which is extracted by said user-information extraction means; and
    said second purchase-instruction sending means for inserting information representing that inquiring is performed by said inquiry means into the second purchase instruction, and sending the second purchase instruction to the merchant site.

3. The online shopping system according to claim 1, wherein said agent device and said settlement device are connected with each other through a private line.

4. An online shopping method for a user of a user device to purchase a product on sale in a merchant site, in an online shopping system comprising:
    reading, at said user device which is connected to the Internet, a merchant site on the Internet;
    replaying and sending, at an agent device connected to said user device and the merchant site, a purchase instruction sent from said user device to the merchant site;
    settling, at a settlement device connected to said agent device, an account for a product purchased in accordance with the purchase instruction from said user device;
    pre-registering ID information of the user, information regarding the user, and information regarding settlement means held by the user, in association with each other in a database of said agent device;
    inputting an instruction for purchasing a product on sale in the shopping site which is read by said user device;
    sending, as a first purchase instruction, the ID information of the user together with information regarding the input product from said user device to said agent device;
    searching the database for user information based on the ID information of the user which is included in the first purchase instruction, and extracting corresponding information regarding the user and corresponding information regarding the settlement means, as performed by said agent device which has received the first purchase instruction;
    sending, as a second purchase instruction, information regarding the user and being extracted from the database from said agent device to the merchant site, together with information regarding the input product; and
    requesting, from said agent device, the settlement device for settling the account for the input product, based on information regarding the settlement means of the user and being extracted from the database.

5. A user device which is connected to Internet, browses a merchant site on the Internet, and sends an instruction for purchasing a product on sale in the merchant site, said user device comprising:
    purchase-instruction inputting means for inputting a purchase instruction of a product on sale in the browsed merchant site;

product-information extraction means for extracting information regarding a product to be purchased from contents of the browsed merchant site and information regarding specified settlement means; and purchase-instruction sending means for sending, as a purchase instruction, the information regarding the product and being extracted by said product-information extraction means and the information regarding the settlement means, together with ID information of a user, to an agent device which is prepared separately from the merchant site and intermediates in a purchase process between the merchant site and said user device.

6. The user device according to claim 5, further comprising:

merchant-site determination means for determining whether the merchant site is browsed; and instruction-input permission means for permitting, when said merchant-site determination means determines that the merchant site is browsed, an input of an instruction from said purchase-instruction inputting means.

7. The user device according to claim 5, wherein said purchase-instruction inputting means is prepared separately from instruction means included in the contents of the browsed merchant site.

8. A user device including a memory for storing a program, a processor for executing the program, an input device for inputting an instruction of a user, a display device for displaying information, and a communications device for transmitting/receiving information with a merchant site served up on Internet, wherein said processor executes the program stored in said memory, thereby:

accessing said merchant site from said communications device, and controlling said communications device to receive contents of said merchant site;

displaying the contents of the merchant site which are received by said communications device on said display device;

permitting the user to input an instruction for purchasing a product on sale in the contents of the merchant site which are displayed on said display device;

extracting information regarding the product to be purchased from the contents of the merchant site displayed on said display device and information regarding specified settlement means; and controlling said communications device to send, as a purchase instruction, the extracted information regarding the product and the information regarding the settlement means, together with ID information of the user to an agent device, which is prepared separately from the merchant site and intermediates in a product purchase process between said user device and said merchant site.

9. A method for browsing a merchant site served up on Internet using a computer device, and for sending an instruction for purchasing a product on sale in the browsed merchant site, said method comprising:

a step of inputting an instruction for purchasing the product on sale in the browsed merchant site;

a step of extracting information regarding the product to be purchased in the browsed merchant site and information regarding specified settlement means, when the instruction is input; and a step of sending, as a purchase instruction, the extracted information regarding the product and the information regarding the settlement means, together with ID information of a user, to an agent device which is prepared separately from the merchant site and intermediates in a purchase process between the computer device and the merchant site.

10. An agent device which is connected to a user device for browsing a merchant site served up on Internet, the merchant site, and a settlement device for settling an account for a product purchased in accordance with a purchase instruction from the user device, said agent device comprising:

user-information storage means for storing ID information of a user using said user device, information regarding the user, and information regarding settlement means held by the user, in association with each other;

purchase-instruction receiving means for receiving, as a first purchase instruction, from said user device, information regarding the product to be purchased by the user on sale in the merchant site and the ID information of the user;

user-information extraction means for searching said user-information storage means for use information based on the ID information included in the first purchase instruction, and extracting corresponding information regarding the user and corresponding information regarding settlement means;

inquiry means for inquiring of said settlement device whether the settlement means is valid, based on the information regarding the settlement means and being extracted by said user-information extraction means;

purchase-instruction sending means for sending, as a second purchase instruction, to the merchant site, the information regarding the user and being extracted by said user-information extraction means and information representing that inquiring is performed by said inquiry means, together with the information regarding the product and being included in the first purchase instruction received by said purchase instruction receiving means; and settlement requesting means for requesting said settlement device for setting a bill for a purchased product, based on the information regarding a product and being included in the second purchase instruction received by said purchase-instruction receiving means and the information regarding the settlement means and being extracted by said user-information extraction means.

11. An agent device comprising: a memory for storing a program; a processor for executing the program; a communications device for transmitting/receiving information with a merchant site served up on Internet, a user device used by a user purchasing a product on sale online in the merchant site, and a settlement device for settling an account for a product purchased in accordance with a purchase instruction from said user device; and a database for registering ID information of the user using the user device, information regarding the user, and information regarding settlement means held by the user, and wherein said processor executes the program stored in said memory, thereby:

controlling said communications device to receive, as a first purchase instruction from said user device, the ID information of the user together with information regarding a product to be purchased by the user on sale in the merchant site;

searching the database for user information based on the ID information included in the first purchase instruction received by said communications device, and extracting corresponding information regarding the user and corresponding information regarding settlement means;

controlling said communications device to inquire of said settlement device whether the settlement means is valid, based on the information regarding the settlement means and being extracted from the database;

controlling said communications device to send, as a second purchase instruction, the infoii cation regarding the user and being extracted from the database and information representing that said settlement means is inquired, together with the information regarding the product and being included in the first purchase instruction received by said communications device to the merchant site; and controlling said communications device to request said settlement device for settling an account for a purchased product included in the first purchase instruction received by said communications device, based on the information regarding the settlement means of the user and being extracted from the database.

12. A method executed in a computer device, which is connected to a user device for reading a merchant site served up on Internet, the merchant site, and a settlement device for settling an account for a product purchased in accordance with a purchase instruction from said user device, said method comprising:

a step of pre-registering ID information of a user using said user device, user information regarding the user, and information regarding settlement means held by the user;

a step of receiving, as a first purchase instruction, ID information of the user together with information regarding a product to be purchased by the user on sale in the merchant site, from said user device;

a step of searching said database based on the ID information included in the received first purchase instruction, and extracting corresponding information regarding the user and corresponding information regarding the settlement means;

a step of inquiring of said settlement device whether the settlement means is valid, based on the information regarding the settlement means of the user and being extracted from said database;

a step of sending, as a second purchase instruction, the information regarding the user and being extracted from said database and information representing that said settlement means is inquired, together with the information regarding the product and being included in the received first purchase instruction, to the merchant site; and a step of requesting said settlement device for settling an account for the purchased product included in the received purchase instruction, based on the information regarding the settlement means of the user and being extracted from the database.

13. A computer readable recording medium recording a program making a computer device, which is connected onto Internet and capable of browsing a merchant site served up the Internet, function as:

purchase-instruction inputting means for inputting an instruction for purchasing a product on sale in the browsed merchant site;

product-information extraction means for extracting information regarding a product to be purchased and information regarding specified settlement means from contents of the browsed merchant site, when the instruction is input from said purchase-instruction inputting means; and purchase-instruction sending means for sending, as a purchase instruction, the information regarding the product and being extracted by said product-information extraction means and the information regarding the settlement means, together with ID information of a user, to an agent device, which is prepared separately from the merchant site and intermediates in a purchase process between the user and the merchant site.

14. The computer readable recording medium according to claim 13, wherein the program makes the computer device further function as:

merchant-site determination means for determining whether a merchant site is being browsed; and instruction-input permission means for permitting an input of an instruction from said purchase-instruction inputting means, when said merchant-site determination means determined that the merchant site is being browsed.

15. A computer readable recording medium recording a program making a computer device, connected to a user device for browsing a merchant site served up on Internet, the merchant site, and a settlement device for settling an account for a product purchased in accordance with a purchase instruction from said user device, function as:

user-information storage means for storing ID information of a user using said user device, user information of the user, and information regarding settlement means held by the user, in association with each other;

purchase-instruction receiving means for receiving, as a first purchase instruction from said user device, the ID information of the user, together with information regarding a product to be purchased by the user on sale in the merchant site;

user-information extraction means for searching said user-information storage means for the user information based on the ID information included in the first purchase instruction, and extracting corresponding information regarding the user and corresponding information regarding settlement means, when said purchase-instruction receiving means receives a first purchase instruction;

inquiry means for inquiring of said settlement device whether the settlement means is valid, based on the information regarding the settlement means of the user and being extracted by said user-information extraction means;

purchase-instruction sending means for sending, as a second purchase instruction, the information regarding the user and being extracted by said user-information extraction means and information representing that inquiring is performed by said inquiry means, together with the information regarding the product included in the first purchase instruction received by said purchase-instruction receiving means, to the merchant site; and settlement requesting means for requesting said settlement device for settling an account for a product, based on the information regarding the product and being included in the second purchase instruction received by said purchase-instruction receiving means, and the information regarding the settlement means of the user and being extracted by said user-information extraction means.

* * * * *